United States Patent [19]

Kita

[11] Patent Number: 5,114,157
[45] Date of Patent: May 19, 1992

[54] GAME MACHINE HAVING PLURAL DISPLAY PANEL UNITS AND PLURAL MEMORY CARTRIDGES

[75] Inventor: Toshihiko Kita, Osaka, Japan

[73] Assignee: SNK Corporation, Osaka, Japan

[21] Appl. No.: 535,568

[22] Filed: Jun. 11, 1990

[30] Foreign Application Priority Data

Dec. 7, 1989 [JP] Japan .................... 1-141943[U]

[51] Int. Cl.⁵ ............................................ A63K 9/22
[52] U.S. Cl. ..................... 273/434; 273/148 B; 273/DIG. 28; 40/544
[58] Field of Search ............... 364/410; 273/148 B, 273/1 E, 433, 434, 435, DIG. 28, 85 G; 40/544

[56] References Cited

U.S. PATENT DOCUMENTS

| | | |
|---|---|---|
| 3,676,943 | 7/1972 | Kidd, Jr. et al. ............... 40/544 |
| 4,117,533 | 9/1978 | Hagelthorn ................ 362/125 |
| 4,195,431 | 4/1980 | Neufeld ..................... 40/544 |
| 4,414,467 | 11/1983 | Gould et al. ............... 273/1 E |
| 4,466,208 | 8/1984 | Logan, Jr. et al. ............ 40/544 |
| 4,516,777 | 5/1985 | Nikora ..................... 273/148 B |
| 4,593,376 | 6/1986 | Volk ........................ 362/52 |
| 4,596,390 | 6/1986 | Studley ................... 273/148 B |
| 4,637,148 | 1/1987 | Barlow ..................... 40/544 |
| 4,865,321 | 9/1989 | Nakagawa et al. ........... 273/148 B |
| 4,922,420 | 5/1990 | Nakagawa et al. ............. 364/410 |

*Primary Examiner*—William H. Grieb
*Assistant Examiner*—Jessica J. Harrison
*Attorney, Agent, or Firm*—Wenderoth, Lind & Ponack

[57] ABSTRACT

A TV game machine includes connectors for detachably connecting a plurality of memory cartridges each having at least non-volatile memories containing a game program, picture data and sound data, a cartridge selecting circuit for selectively accessing one of the memory cartridges in cooperation with an externally controllable switch and the connectors, and a processor for executing the game program of the selected game cartridge while processing the picture data and sound data contained therein. A display panel is provided which is divided into a plurality of panel units each corresponding to the respective game cartridges for illuminating one segment at a time in response to a switch command.

8 Claims, 3 Drawing Sheets

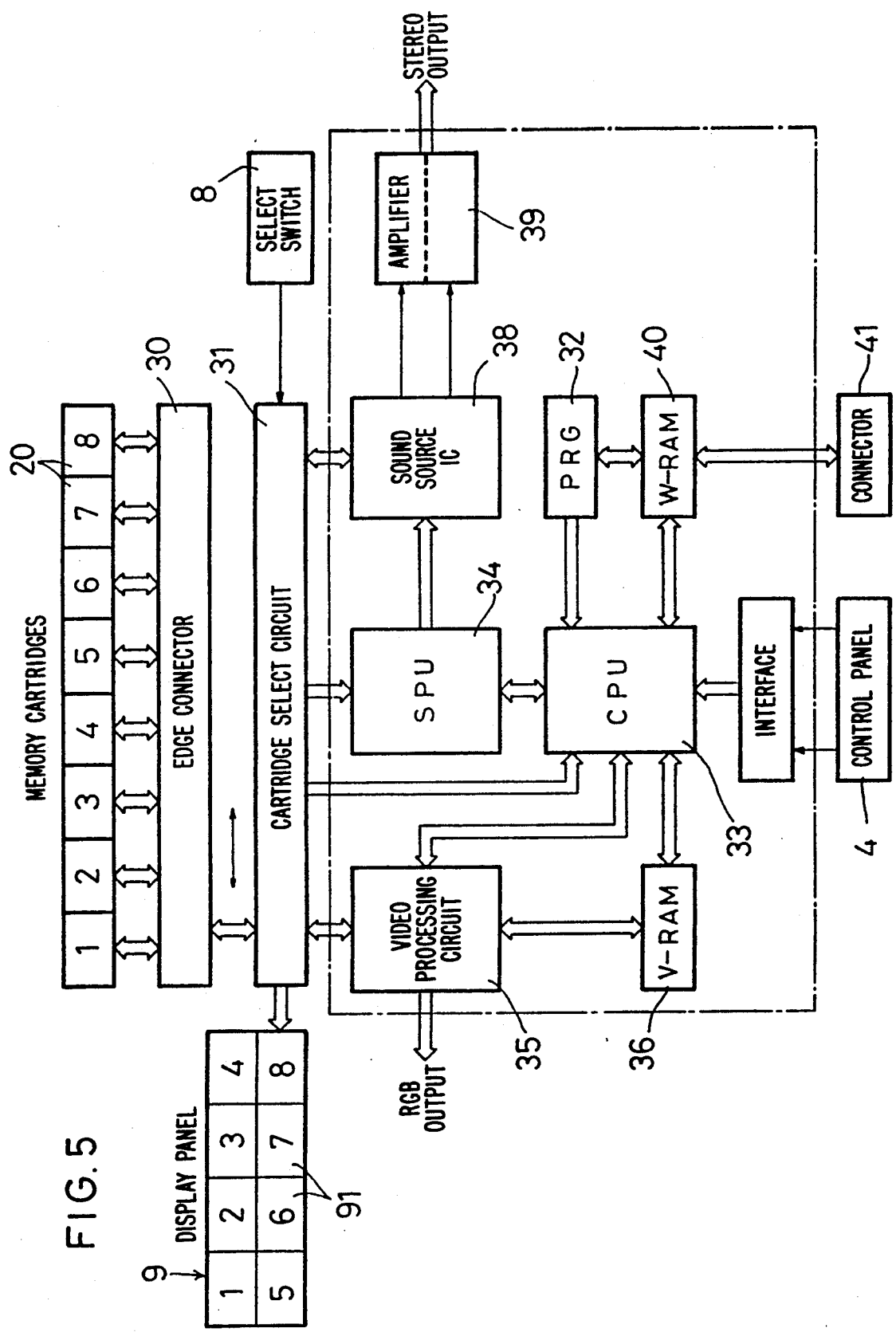

GAME MACHINE HAVING PLURAL DISPLAY PANEL UNITS AND PLURAL MEMORY CARTRIDGES

The present invention relates to a TV game machine, and specifically to a TV game machine for commercial use.

With prior art commercial TV game machines, only one kind of game can be played using a single machine. To play a different game, it is necessary to replace a printed circuit board for the one game with another printed circuit board. A game machine in which a plural kinds of games can be played is desired. However, its mechanisms should be relatively simple to prevent an undue increase in cost. Also, such a game machine should have means for informing the player of which one of the games is currently being played.

It is an object of the present invention to provide a relatively low cost TV game machine which allows a player to select any one game from among a plurality of games.

The TV game machine according to the present invention includes connecting means for detachably connecting a plurality of memory cartridges each comprising at least non-volatile memories containing a game program, picture data and sound data, a cartridge select circuit for selecting one of the memory cartridges and making accessible the thus selected memory cartridge in cooperation with an externally controllable switch and the connecting means, a display panel divided into a plurality of segments each corresponding to the respective game cartridges for illuminating one segment at a time in response to the command from the switch, and a processor for executing the game program of the selected game cartridge while processing the picture data and sound data contained therein.

By operating the select switch, the cartridge select circuit selects a memory cartridge so that the processor can gain access thereto. At the same time, the segment in the display panel corresponding to the selected game is illuminated. Thus, the player can clearly recognize the game which is to be played.

According to the present invention, a plurality of memory cartridges can be detachably mounted in the TV game machine. The latter is provided with a panel showing the contents of the game and a switch for selecting one of these games. Thus, a plurality of games can be played with a single game machine, rather than requiring a plurality of game machines. This will lead to a reduction in cost. Also, by the provision of the display panel, the player can clearly recognize which one of the games is currently being played.

Other features and objects of the present invention will become apparent from the following description taken with reference to the accompanying drawings, in which:

FIG. 5 is a block diagram showing the structure of the TV game machine.

Figure 1:
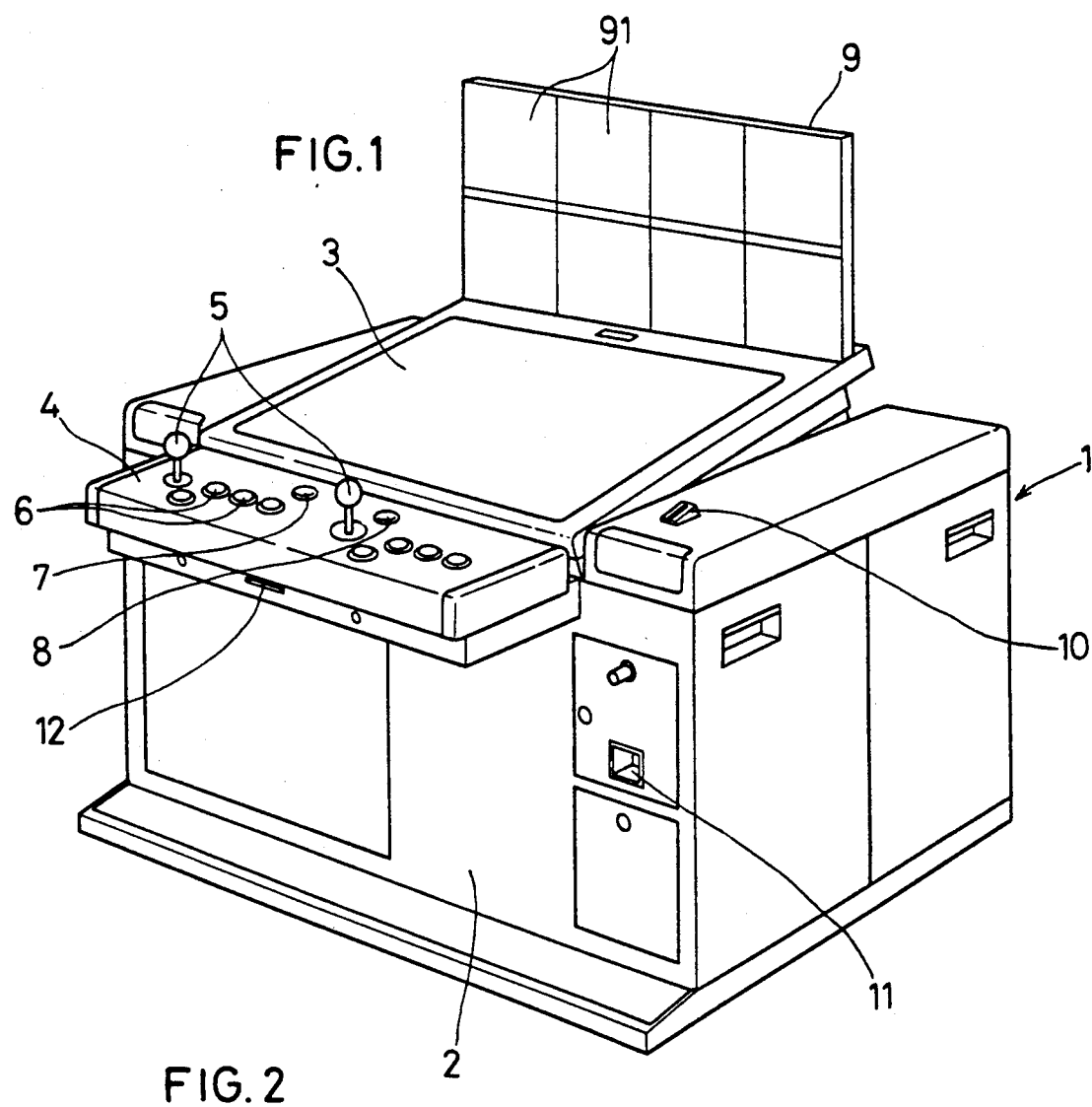
FIG. 1 is a perspective view of the embodiment of the present invention.

As shown in FIG. 1, a TV game machine 1 includes a cabinet 2, a CRT 3 mounted on the top of the cabinet 2, and a front control panel 4 provided with joysticks 5 and shot buttons 6, a game start button 7, and a game select switch 8. At the rear part of the cabinet 2, a display panel 9 stands upright. The cabinet 2 is also provided with a coin insert slot 10, a coin return opening 11 and an IC card insert slot 12.

The display panel 9 is divided into a plurality (eight in the depicted embodiment) of segments 91 which are each used to illustrate a type of a game, simple how-to-play instructions using letters and pictures, etc. By pressing the select button 8, one of the segments is illuminated to allow the player to distinguish the game selected.

Figure 2:
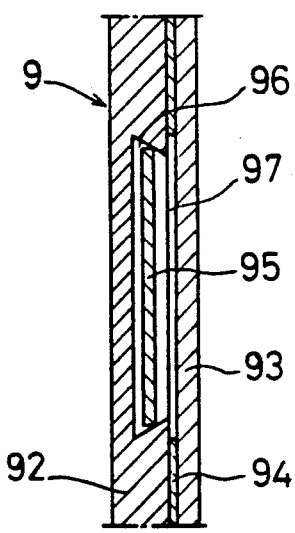
FIG. 2 is a cross-sectional view of the display panel of the same.

As shown in FIG. 2, the panel 9 may include a transparent front plate 92 and a back plate 93 bonded together by an adhesive. The front plate 92 is formed with grooves for inserting unit panels 95 which are for showing the respective type of games, how-to-play instructions, etc. Electroluminescence (EL) element plates 97 each having substantially the same shape and same area as the unit panels 95 are bonded to the back plate 93. Print wiring 94 is formed on the back plate 93 to activate the EL element plates 97.

Figure 3:
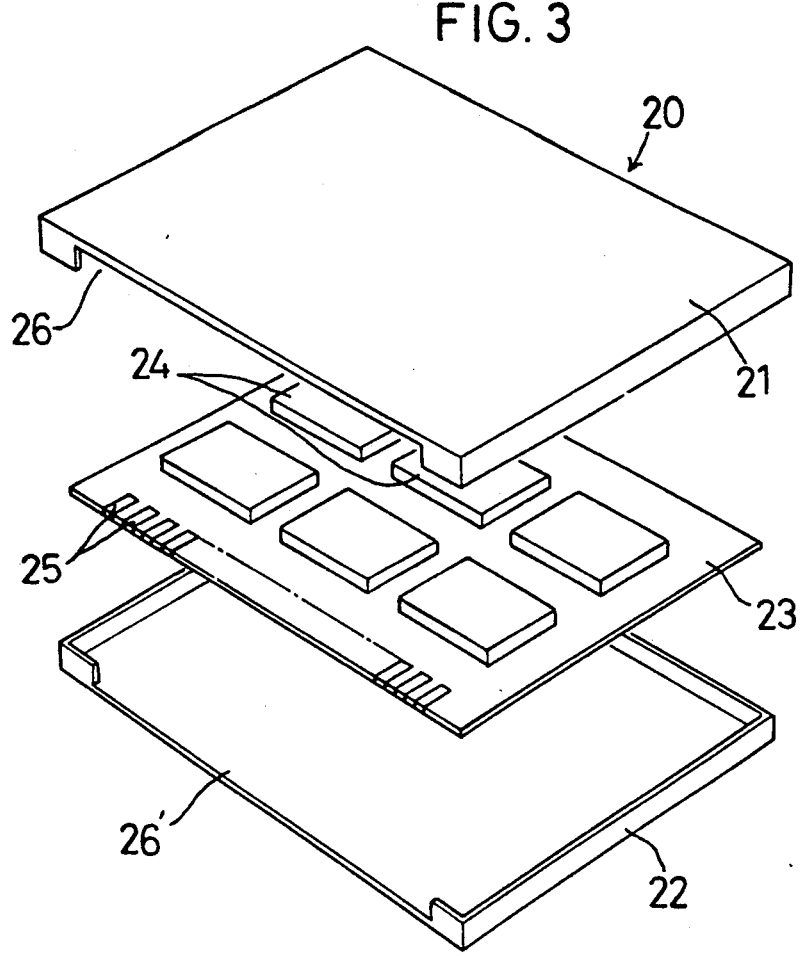
FIG. 3 is an exploded perspective view of an example of the memory cartridge.
Figure 4:
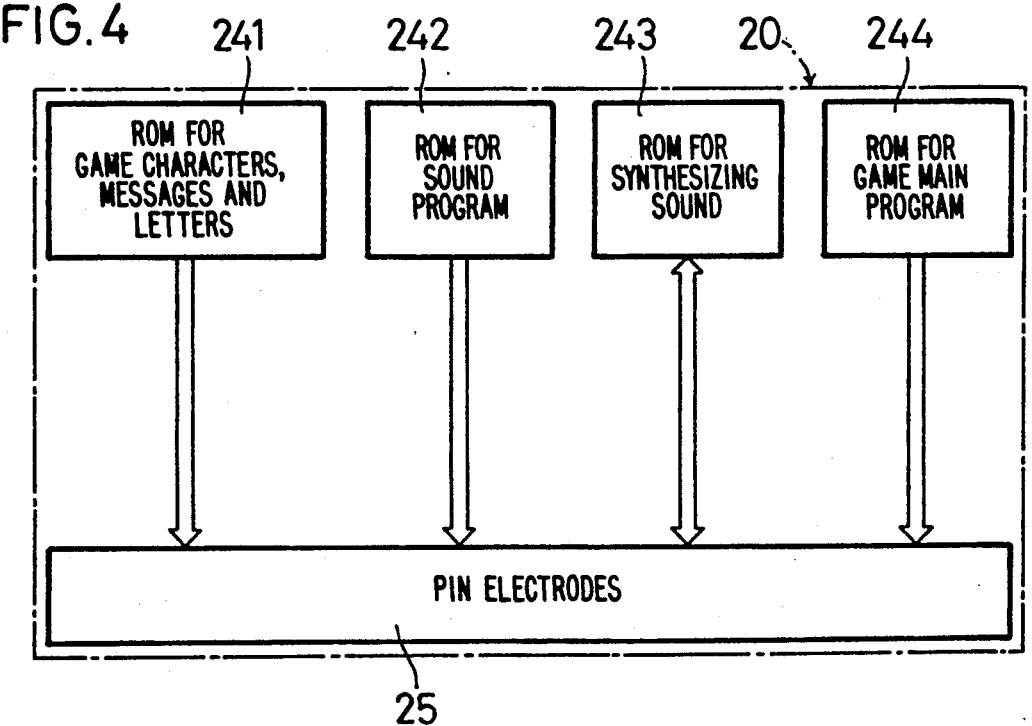
FIG. 4 is a block diagram showing the structure of the same.

FIGS. 3 and 4 show an example of a memory cartridge 20. The memory cartridge 20 includes top and bottom covers 21 and 22 and a printed circuit board 23. The covers 21 and 22 are bonded together to form a casing with the printed circuit board 23 housed therein.

A plurality of non-volatile memories 24, such as ROM's, are mounted on the board 23 and connected to a group of pin electrodes 25 by suitable print wiring. The pin electrodes 25 are exposed to openings 26 and 26' formed in the front sides of the covers 21 and 22.

As shown in FIG. 4, the non-volatile memories 24 include a ROM 241 which contains picture images such as game characters, messages and letters, a ROM 242 for a sound program, a ROM 243 for synthesizing sound and a ROM 244 containing a main program for the game.

The group of pin electrodes 25 are connected to an edge connector of the TV game machine 1 by setting the memory cartridge 20 in the cabinet 2 of the TV game machine.

FIG. 5 shows an example of the internal structure of the game machine 1.

A plurality (eight in the depicted embodiment) of memory cartridges 20 are connected to the edge connector 30 and unit panels 95 corresponding to the respective memory cartridges 20 are fitted in the segments 91.

By pressing the select switch 8, the segments 91 will be illuminated one after another. The pressure on the switch 8 is released when the segment corresponding to a desired game is illuminated. At the same time, a desired cartridge is selected from among the plurality of cartridges 20 by a cartridge select circuit 31 and is put in an accessible state.

When a start button 7 is pressed, the program PRG 32 in the main body will allow a central processing unit 33 (such as 68000 CPU) and a sound processing unit (SPU) 34 (such as Z80 CPU) to gain access to the game main program ROM 244 and the sound program ROM 242, respectively.

Upon starting the game, the game main program is executed in response to the operation of the joysticks 5 and the shot buttons 6 to control a video processing circuit 35 and the SPU 34. The video processing circuit 35 gains access to the picture ROM 241 according to the control of the CPU 33. The picture ROM 241 contains 4×1024 characters, for example, each character consisting of 16×16 dots, each dot consisting of 4 bits. Four 1-megabit ROM's are needed to store this amount of information.

Multicolor representation is of course impossible with four-bits per dot. This four-bits per dot information is used only to specify the color storage numbers in a palette stored in RAM's (not shown) to which video processing circuit 35 can gain access. A V-RAM 36 contains a table showing in a one-to-one relationship the number and position of each character on the monitor 3 as well as an area for sprite. The video processing circuit 35 takes out the characters in the ROM's 241 while gaining access to the corresponding portions therein to give colors to the characters by the palette, which are then given as RGB signals.

The sound processing unit 34 runs the sound program in the ROM 242 as the main program progresses, to give sound outputs to an amplifier 39 according to the content of the sound synthesizing ROM 53 which are memorized as digital information, by actuating a sound source IC.

A work RAM (W-RAM) 40 is a memory for temporarily storing the current status and score of the game. By transferring the content of this RAM to an IC card having a backup power supply inserted in the slot 12 (FIG. 1), the game can be resumed later.

What is claimed is:

1. A game machine comprising:
    a display panel comprising N discrete panel units, N being a positive integer greater than one;
    N discrete memory cartridges each including memory means for storing respective game data;
    wherein said N discrete panel units are provided in one-to-one correspondence with said N discrete memory cartridges and wherein each of the N discrete panel units includes means for displaying a game screen of the game data stored in a corresponding one of said N discrete memory cartridges;
    a select switch;
    memory cartridge select means, operatively coupled to said select switch and to said N discrete memory cartridges and to said display panel, for selectively accessing one of said N discrete memory cartridges and for selectively illuminating one of said N discrete panel units in response to said select switch; and
    processor means for executing the game data of one of said N discrete memory cartridges accessed by said memory cartridge select means;
    wherein said display panel includes a front plate and a back plate defining a plurality of grooves therebetween, and wherein each of said N discrete panel units includes an electroluminescence element and a panel insertable in one of said plurality of grooves, said panel including indicia indicative of the game data stored in a corresponding one of said N discrete memory cartridges.

2. A game machine as recited in claim 1, wherein said memory cartridge select means includes means for successively illuminating said N discrete panel units in response to said select switch.

3. A game machine as recited in claim 2, wherein the front panel is transparent.

4. A game machine as recited in claim 3, wherein said N discrete memory cartridges are each detachably coupled to said memory cartridge select means.

5. A game machine as recited in claim 2, wherein said N discrete memory cartridges are each detachably coupled to said memory cartridge select means.

6. A game machine as recited in claim 1, wherein the front panel is transparent.

7. A game machine as recited in claim 6, wherein said N discrete memory cartridges are each detachably coupled to said memory cartridge select means.

8. A game machine as recited in claim 1, wherein said N discrete memory cartridges are each detachably coupled to said memory cartridge select means.

* * * * *